United States Patent
Kraft (10) Patent No.: US 7,634,728 B2
(45) Date of Patent: Dec. 15, 2009

(54) SYSTEM AND METHOD FOR PROVIDING A RUNTIME ENVIRONMENT FOR ACTIVE WEB BASED DOCUMENT RESOURCES

(75) Inventor: Reiner Kraft, Gilroy, CA (US)

(73) Assignee: International Business Machines Corporation, Armonk, NY (US)

(*) Notice: Subject to any disclaimer, the term of this patent is extended or adjusted under 35 U.S.C. 154(b) by 1423 days.

(21) Appl. No.: 10/331,738

(22) Filed: Dec. 28, 2002

(65) Prior Publication Data

US 2004/0128616 A1 Jul. 1, 2004

(51) Int. Cl.
*G06F 17/00* (2006.01)
(52) U.S. Cl. .................................................. 715/255
(58) Field of Classification Search ............... 715/513, 715/255
See application file for complete search history.

(56) References Cited

U.S. PATENT DOCUMENTS

| | | | | |
|---|---|---|---|---|
| 5,579,519 | A | 11/1996 | Pelletier | 395/705 |
| 5,761,684 | A * | 6/1998 | Gibson | 715/515 |
| 5,995,756 | A | 11/1999 | Herrmann | 395/712 |
| 6,061,695 | A | 5/2000 | Slivka et al. | 707/513 |
| 6,192,381 | B1 | 2/2001 | Stiegemeier et al. | 707/505 |
| 6,216,141 | B1 | 4/2001 | Straub et al. | 707/513 |
| 6,237,011 | B1 | 5/2001 | Ferguson et al. | 707/515 |
| 6,240,429 | B1 * | 5/2001 | Thornton et al. | 715/500 |
| 6,253,217 | B1 | 6/2001 | Dourish et al. | 707/500 |
| 6,253,257 | B1 | 6/2001 | Dundon | 709/331 |
| 6,266,058 | B1 | 7/2001 | Meyer | 345/339 |
| 6,266,682 | B1 | 7/2001 | LaMarca et al. | 707/501 |
| 6,269,380 | B1 | 7/2001 | Terry et al. | 707/200 |
| 6,275,983 | B1 | 8/2001 | Orton et al. | 717/5 |
| 6,278,448 | B1 | 8/2001 | Brown et al. | 345/333 |
| 6,665,836 | B1 * | 12/2003 | Wynblatt et al. | 715/501.1 |
| 2001/0003835 | A1 | 6/2001 | Watts | 709/318 |
| 2003/0120639 | A1 * | 6/2003 | Potok et al. | 707/3 |
| 2004/0088646 | A1 * | 5/2004 | Yeager et al. | 715/500 |

OTHER PUBLICATIONS

Satoh, Ichiro; "Mobile Agent-based Compound Documents", Proceedings of the 2001 ACM Symposium on Document Engineering, Nov. 2001, pp. 76-84.*

Koppen et al., "Active Hypertext for Distributed Web Applications", Proceedings of the 8th IEEE International Workshops on Enabling Technologies: Infrastructure for Collaborative Enterprises, Jun. 1999, p. 1-6.*

(Continued)

*Primary Examiner*—Amelia Rutledge
(74) *Attorney, Agent, or Firm*—Cantor Colburn LLP; Leonard Guzman (57) ABSTRACT

A computer program product provides an active interactive document resource with an active shell surrounding its data. The shell operates in a runtime environment, a nest, and can operate with a helper process for the coordination and distribution of tasks. The active document in conjunction with its shell provides functionality in basic document management features, interactivity features, search, and other miscellaneous features such as imbedding dynamically generated content. Basic document features include automatic update or synchronization of document content, maintaining a list of similar documents, adding related or updated content, automatic update of the document's index, and automatic update and conversion of the underlying document format. Interactivity features include interacting with other documents within the same nest or other nests, interacting with users, and maintaining security.

25 Claims, 10 Drawing Sheets

OTHER PUBLICATIONS

Koppen, et al., "A Practical Approach towards Active Hyperlinked Documents", Proceedings of the 7th World Wide Web Conference, Brisbane 1998, p. 1-10.*

Yankelovich, et al., "Intermedia: The Concept and the Construction of a Seamless Information Environment", Computer, vol. 21, Issue 1, Jan. 1988, p. 81-96.*

H. Ahonen et al., "Intelligent Assembly Of Structured Documents," Helsinki, Jun. 1996.

P. Guillaume et al., "Globule: A Platform For Self-Replicating Web Documents," Proceedings of the 6th International Conference on Protocols for Multimedia Systems, LNCS 2213, Oct. 2001.

D. Terry et al., "Active Tioga Documents: An exploration of two Paradigms," May 1990.

V. Quint et al., "Making Structured Documents Active," Jun. 1994.

"Structured And Intelligent Documents" University of Helsinki Department of Computer sience http://www.cshelsinki.fi/research/rati/sid.html, printed Sep. 18, 2002.

A. Weber, et al. "Live Documents With Contextual Data-Driven Information Components," SIGDOC, 2002.

C. Sangpachatanaruk et al., "An Architecture For A Personalized Web Of Active Documents," Proceedings of the IASTED International Conference, Parallel and Distributed Computing and Systems, Nov. 6-9, 2000.

* cited by examiner

SYSTEM AND METHOD FOR PROVIDING A RUNTIME ENVIRONMENT FOR ACTIVE WEB BASED DOCUMENT RESOURCES

FIELD OF THE INVENTION

The present invention generally relates to active documents, and more specifically to an active shell surrounding the active document, for providing basic management and connectivity features. The shell operates in a runtime environment and operates with a helper process for the coordination and distribution of tasks.

BACKGROUND OF THE INVENTION

Typical documents created using current technology are passive. Documents are files that do not typically have executable code. The lowest representation level of data is the binary representation in a computer's memory, which data requires an interpreter to retrieve the semantics of that data. In a higher level context, a document adheres to a specification of its format to allow exchange and compatibility. Some application software is required to interpret, view, print, and interact with that document, reflecting the essentially passive nature of current document technology.

Associating code and an execution environment with a document would transform it from a passive state to an active entity. The term "active document" is widely used in various different contexts. For the purposes of this discussion, an "active document" is defined as representing a lightweight executable software code that acts as a container for static or dynamically generated document resources. The active document provides a workplace to store additional data. In addition, it has a well-defined interface to interact with other live active documents, networks, persons, or other entities.

An active document has an associated set of behaviors that have been referred to as activities. Activities are arbitrary actions performed as a result of a user opening, scrolling, editing, or closing a document. Although a document's activities are actually triggered by the document editor, they are associated with the document and preserved when the document is filed, copied, or even electronically mailed. Users have conventionally marked arbitrary items in a document as active or associate queries. However, a specific application, typically a special document-editor application, is still required to load and then execute the active document. If this document editor application is terminated, the document is no longer active.

The Internet currently comprises mostly documents that are either static or dynamically generated. Transforming these passive resources into active participants would change the way the Internet behaves in various ways. First, live active documents are smart about their content. They can update document format, synchronize with newer versions, add related content, etc. Second, active documents can interact with other documents and users, exchange information, notify persons about their existence, and even trigger actions in a user's personal information manager (e.g. active calendar). Thus, there is a need for active documents that can be edited or otherwise manipulated by a variety of applications and can be treated as a process instead of a file. The need for such a system has heretofore remained unsatisfied.

SUMMARY OF THE INVENTION

The present invention satisfies this need, and presents a system, a computer program product, and a associated method (collectively referred to herein as "the system" or "the present system") for providing a runtime environment for interactive and live web based document resources. The present system is a live interactive document resource with an active shell surrounding its data.

The shell comprises software code, such as Java, that provides basic management and connectivity features. The shell acts as a container holding the document data along with a work place to store additional data. Each shell has an interface accessible through an application programming interface (API) or a graphical user interface (GUI). One example of an API in this instance would be Internet services. The shell operates in a runtime environment called a nest and can operate with a helper process for the coordination and distribution of tasks.

The active document in conjunction with its shell provides novel functionality in basic document management features, interactivity features, search, and other miscellaneous features, such as imbedding dynamically generated content. Basic document management features include automatic update or synchronization of document content, maintaining a list of similar documents, adding related or updated content, automatic update of the document's index, and automatic update and conversion of the underlying document format. Interactivity features include interacting with other documents within the same nest or other nests, interacting with users, and maintaining security.

To synchronize the document content, the user provides to the document's shell the origin of the document (e.g. the URL of the document). The shell is then able to compare and synchronize its content with the original document on an automatic or user specified schedule. Consequently, the user will always have access to a document with current content. The document initiates the content synchronization, reflecting the active nature of the document.

To maintain a list of similar documents, the shell requests the helper to search for particular documents (e.g. using the indexed keywords as a search criteria). The active document can automatically search for similar documents in the same nest or in one or more different nests. When searching for similar documents, the helper "asks" other shells if they are related or similar to the shell originating the request. A related or similar active shell responds to the helper's request. The helper then forwards this response to the shell that originated the request. It is also possible for a shell to ask the helper for a list of shells within the nest; the shell can then submit the request directly to the neighboring shells.

When a new shell is added to a nest, the helper informs all shells occupying the same nest that a new shell has arrived. Other shells can then add this event to their event queue. After some random time delay, these shells can contact their new neighbor. This time delay allows the new shell time to "rest".

Similarly, if a shell is deleted, the deleted shell sends its list of similar documents to the helper. The helper notifies the documents on this list of the deletion, eliminating pointers to nonexistent similar documents. In general, a relation between two shells is always a two-way relation; referential integrity in this relation will be enforced. The functionality of a reference list of similar documents provides a fast and convenient lookup for a user. The size of the list may be limited to a specific manageable size.

Each document in the list will have a similarity score, managed by a priority queue. If a new document is similar, it will be entered in the list only if its similarity score is at least as large as the least similar document. The least similar document may then be deleted from the list, and the relationship with the least similar document is terminated.

Another document management feature is adding related or updated content, making the active document a living document. A living document actively adds pertinent content without user intervention. Periodically, the shell may look for additional or updated content from various sources. For example, a document might represent a hub for computing resources. A shell is equipped with a web crawler or search module to crawl or search the web for related documents, updated content, etc. When located, this new content is added to the shell's workplace. Crawling and search tasks may be assigned to the helper to balance the work load between the shell and the helper.

In principal, every task of a shell might be propagated to the helper. The helper uses models of distributed processing to coordinate and run the tasks, returning the results to the shell at a later time. A user is able to customize this gathering process. A GUI for the shell would allow the user set an update schedule, specify which portions of the document to update, etc.

A third document management feature is automatic update of the document's index. The shell automatically updates its index when content is added or modified. In addition, the shell sends a notification request to similar shells (stored in the list of similar documents) to verify that these documents are still similar. A key feature of the present system is that the shell for each document maintains an index for that document. As opposed to a centralized index maintained by the application, the index is decentralized and maintained on the document level.

Another document management feature is automatic update and conversion of the underlying document format. A user may not have an appropriate viewing device for interpreting the document data. For example, a shell may contain a PostScript® document. A user with no PostScript® viewer will be unable to view the document as stored. However, the user does have a JPG viewer. In situations such as this, the shell then asks the helper to convert the data on the fly and store the additional data in a supported format in the shell. The document content can now be displayed in the user's JPG viewer.

In addition, a document format might change over time. For example, the document format of word processing documents might be upgraded to support more features. HTML documents on the Internet might change as document standards evolve. A shell monitors its document format and automatically modifies the new format as required. The helper performs the conversion; the new format is saved in the shell.

One interactivity feature of the present system is the ability to interact with other documents. A shell can interact with other shells in the same nest or with shells in other nests. It can request a list of shells in the same nest from the helper. The helper itself can register with other helpers. Consequently, helpers can contact other helpers to retrieve a list of shells of other nests. The shell itself can get in touch with a different shell using standard networking protocols, such as SOAP.

A shell can be identified through its unique address. The interaction feature of shells might be used to exchange data. For instance, a shell could exchange the list of similar documents with a similar shell. This merges the two lists into one, enhancing the list of similar documents for both shells. In addition, shells might exchange various content, synchronize content, and so forth.

Another interactivity feature of the present system is the ability to interact with users. A shell can be connected to a personal and social automation management system, providing novel features for that management system. An active document recognizes that a particular user might be interested in its content and notifies this user. Consequently, instead of a user searching for documents, the documents come to the user.

One method for implementing this feature is through the user listing their hobbies and interests with the management system. A shell might then contact the management system to locate users who might be interested in its content. The management system might then reply with a list of potential users. The shell might then send an email, instant message, or other message to this user providing a thumbnail or preview of its content. An interested user can interact with the shell, clone the shell to have a copy in the user's nest, etc. Furthermore, if the user likes the document content, the shell could notify similar shells to send a preview to this user. In addition, a shell can store the contact information for interested users for future occasions.

Another interactivity feature of the present system is security. A nest will have security features implemented to maintain access control over its shells. In addition, all shells will have an access control list. In principle, a shell could derive its access control list from the access control list of the document. Standard security technologies such as those used in operating systems can be applied to help coordinate access permission and prevent unauthorized document access.

A feature of the present system is its active search architecture. Current search technology is based on the principle of gathering information from the Internet, indexing it, and making it available for search. However, the Internet grows so rapidly that most of the major search engines are unable to keep up. Documents on the Internet are frequently modified, added, deleted, etc. Many new Internet sites appear on a daily basis. Active documents provide the basis for a new and novel search architecture that can complement the existing standard Internet search architecture.

The active search architecture allows a shell to register its index and identity with a search engine supporting active documents. The search engine can then integrate this data in a searchable index. Once a document is deleted, it will send an erase request to the search engine. The active document will also notify a search engine automatically of changes in its index. The active search architecture eliminates the need for crawling or re-crawling resources; the document itself acts when modified. Furthermore, an active document can have a reference list of search engines with which it is registered (similar to the reference list for similar active documents).

In an alternate embodiment, the helper could be responsible for maintaining a global index for a nest and for registering or exchanging that index with a search engine that supports active documents. This intermediary hierarchy could help to distribute and eliminate some network traffic.

Another feature of the present invention is the ability to embed dynamically, generated content in a document. The features previously discussed primarily address static documents. A static document is created at a specific time and its content is not changing. In contrast, a dynamically generated document is created by some script or is executable at run time (e.g. at the user's request). Active documents can support dynamically generated documents by providing a runtime environment inside the shell for scripts, executables, etc. The content of such a document is then generated on demand or request based on various input parameters and may differ each time requested.

With XML as a standard for describing content and structure and the advances in Java and web services architecture, the implementation of live active documents is technically feasible. Different vendors can implement different products based on the technology. Existing document resources can easily be converted into live documents using the appropriate tool. Current document technology and applications adhere to predefined standards; consequently, communication between different products is no problem.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Active Document: A lightweight executable software code that acts as a container for static or dynamically generated document resources.

Hit: A response to a search query. The response is a document found by the search engine that contains key words or other attributes relevant to the search query.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (HyperText Transport Protocol): The communications protocol used to connect to servers on the World Wide Web. Its primary function is to establish a connection with a Web server and transmit HTML pages to the client browser.

Internet: A collection of interconnected public and private computer networks that are linked together with routers by a set of standards protocols to form a global, distributed network.

SGML (Standard Generalized Markup Language): A generic language for writing markup languages. SGML enables different presentations of the same information by defining the general structure and elements of a document.

SOAP (Simple Object Access Protocol): A protocol that provides a way for applications to communicate with each other over the Internet, independent of platform, or the underlying hardware or software for a system.

URL (Uniform Resource Locator): A unique address that fully specifies the location of a content object on the Internet. The general format of a URL is protocol://server-address/path/filename.

World Wide Web (WWW, also Web): An Internet client—server hypertext distributed information retrieval system.

XML: extensible Markup Language. A standard format used to describe semi-structured documents and data. During a document authoring stage, XML "tags" are embedded within the informational content of the document. When the XML document is subsequently transmitted between computer systems, the tags are used to parse and interpret the document by the receiving system.

Figure 1:
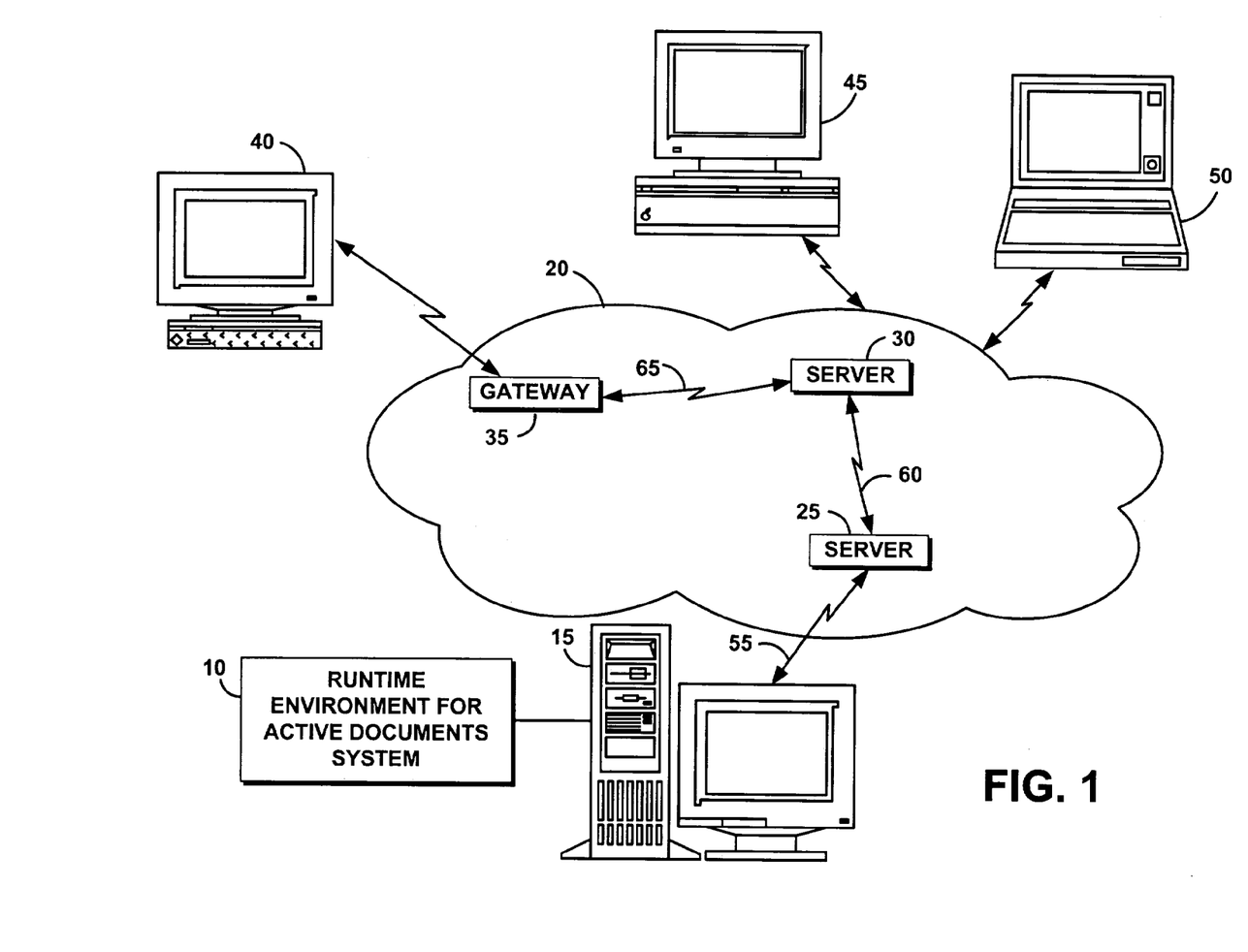
FIG. 1 is a schematic illustration of an exemplary operating environment in which a system for providing a runtime environment for interactive or live web based document resources can be used according to the present invention.

FIG. 1 portrays an exemplary overall environment in which a system and associated method for providing a runtime environment for interactive and live web based document resources according to the present invention may be used. System 10 includes a software programming code or computer program product that is typically embedded within, or installed on a host server 15. Alternatively, system 10 can be saved on a suitable storage medium such as a diskette, a CD, a hard drive, or like devices. While the system 10 will be described in connection with the WWW, the system 10 can be used with a stand-alone database of terms that may have been derived from the WWW and/or other sources.

The cloud-like communication network 20 is comprised of communication lines and switches connecting servers such as servers 25, 30, to gateways such as gateway 35. The servers 25, 30 and the gateway 35 provide the communication access to the WWW or Internet. Users, such as remote Internet users, are represented by a variety of computers such as computers 40, 45, 50, and can query the host server 15 for desired information through the network 20. Computers 40, 45, 50 each include software that will allow the user to browse the Internet and interface securely with the host server 15. The host server 15 is connected to the network 20 via a communications link 55 such as a telephone, cable, or satellite link. The servers 25, 30 can be connected via high-speed Internet network lines 60, 65 to other computers and gateways.

Figure 2:
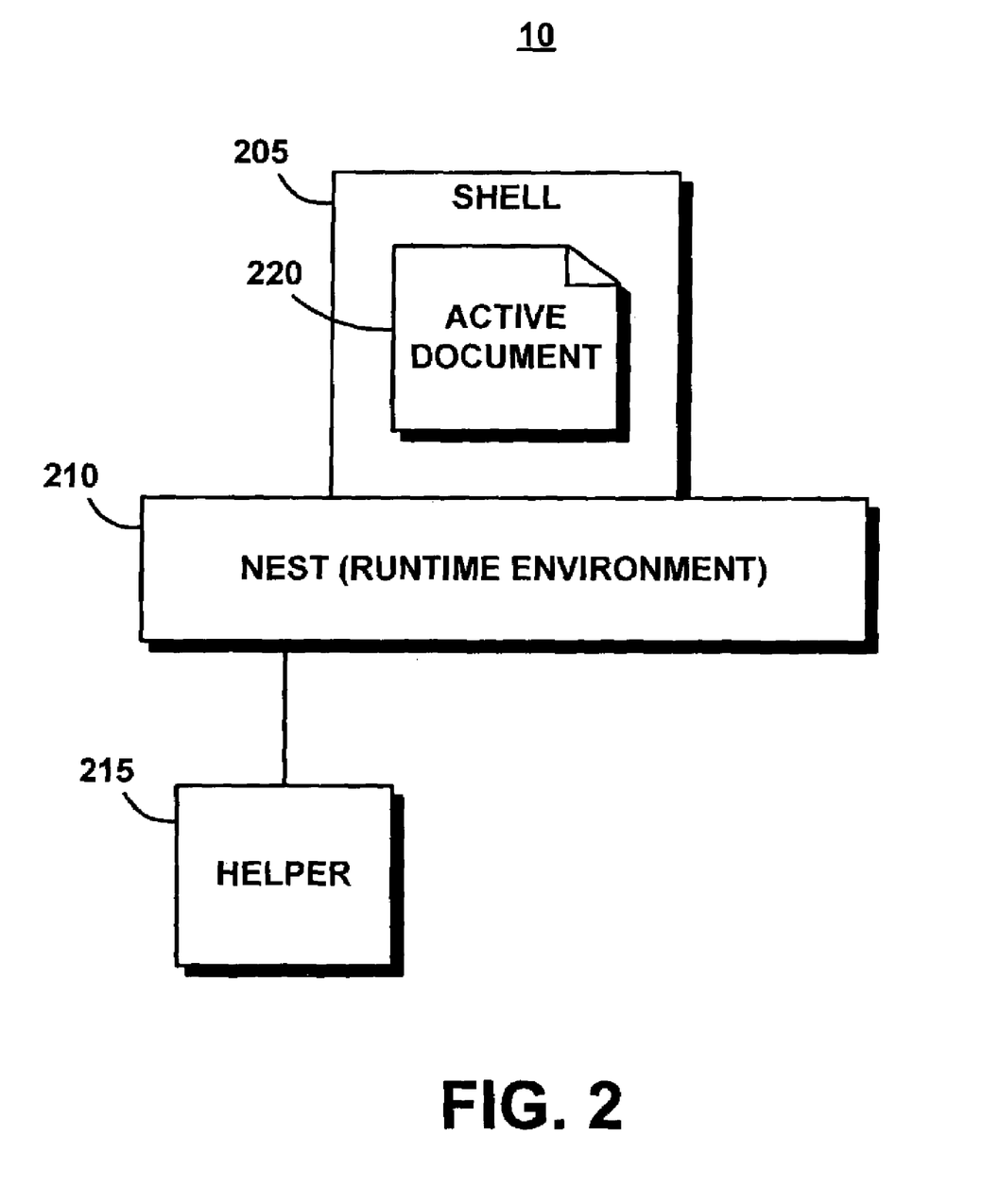
FIG. 2 is a block diagram of the high-level architecture of the system of FIG. 1.

The high-level architecture of system 10 is illustrated by the block diagram of FIG. 2. System 10 comprises a shell 205, a runtime environment called a nest 210, and a coordination manager and task distribution unit called a helper 215. Shell 205 comprises software code implemented, for example, in Java® that provides some basic management and connectivity features. Shell 205 acts as a container holding the data for the active document 220. Shell 205 operates in nest 210. Nest 210 can easily be integrated into current operating systems.

Figure 3:
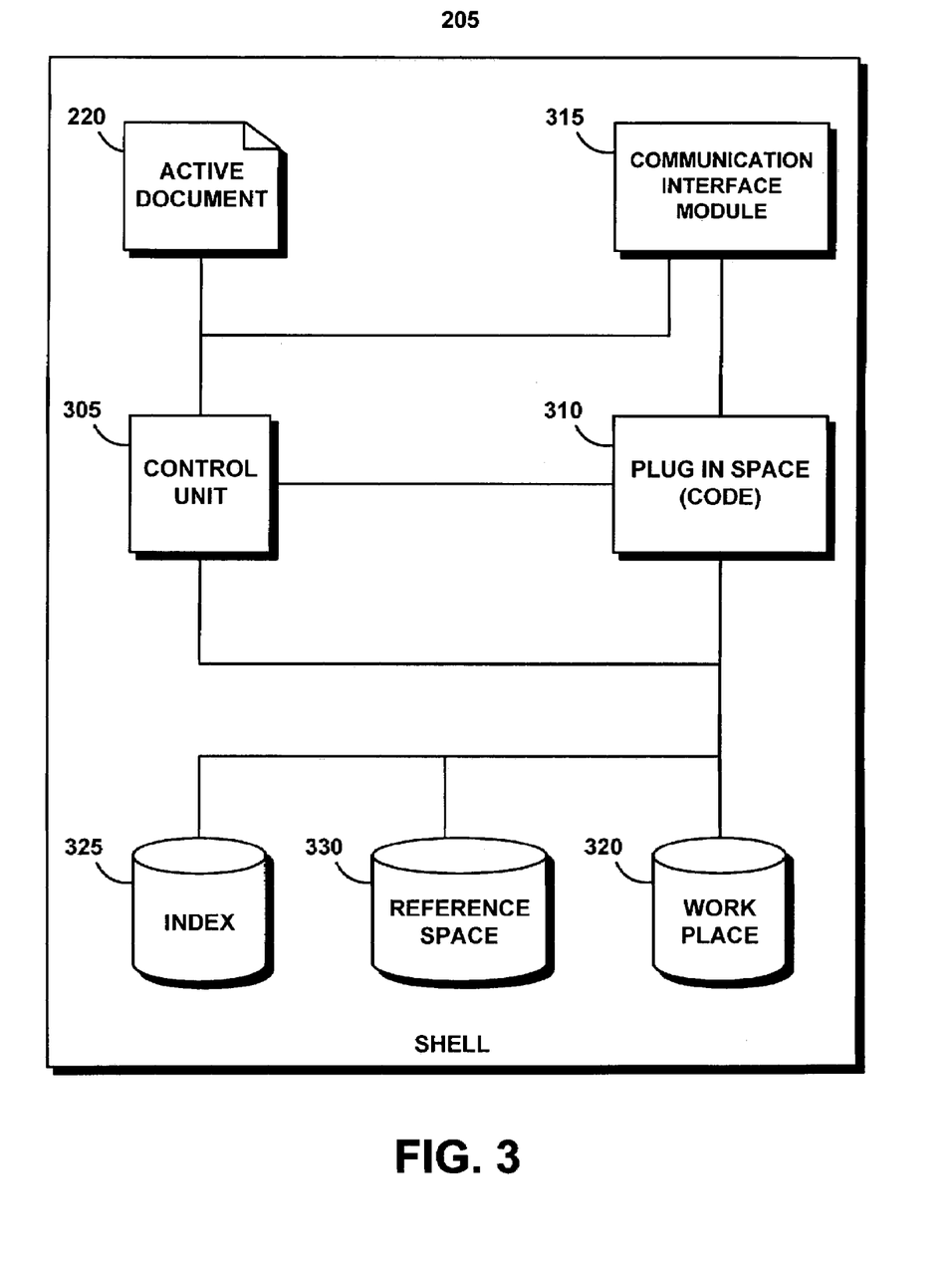
FIG. 3 is a block diagram of a shell of the system of FIGS. 1 and 2.

A block diagram for the architecture of shell 205 is shown in FIG. 3. A tool can be used to convert a standard document resource into a live active document 220. The conversion process integrates the content of the standard document into shell 205. During this process, the standard document is converted into a normalized structure for internal representation within shell 205. This normalized structure is the active document 220, typically written in languages such as SGML or XML. However, the normalized structure is not required.

If necessary, a shell 205 can contain multiple copies of the data in different formats. A shell 205 has a control unit 305 that manages all interactions with other shells, nests, and helpers. The plug in space 310 provides storage for additional software code, providing extensibility. The communication interface management 315 manages the external communication with other shells similar to the functionality of a protocol handler. The implementation of the communication interface management 315 should be based on communications standards such as SOAP. Each shell 205 has a work place 320 for persistent data storage in addition to storage space for its index 325 and reference space 330. System 10 decentralizes the index; each active document 220 now has its own index 330 referring to its content. When the user queries against the active document 220, the active document 220 itself responds to the query.

Figure 4A:
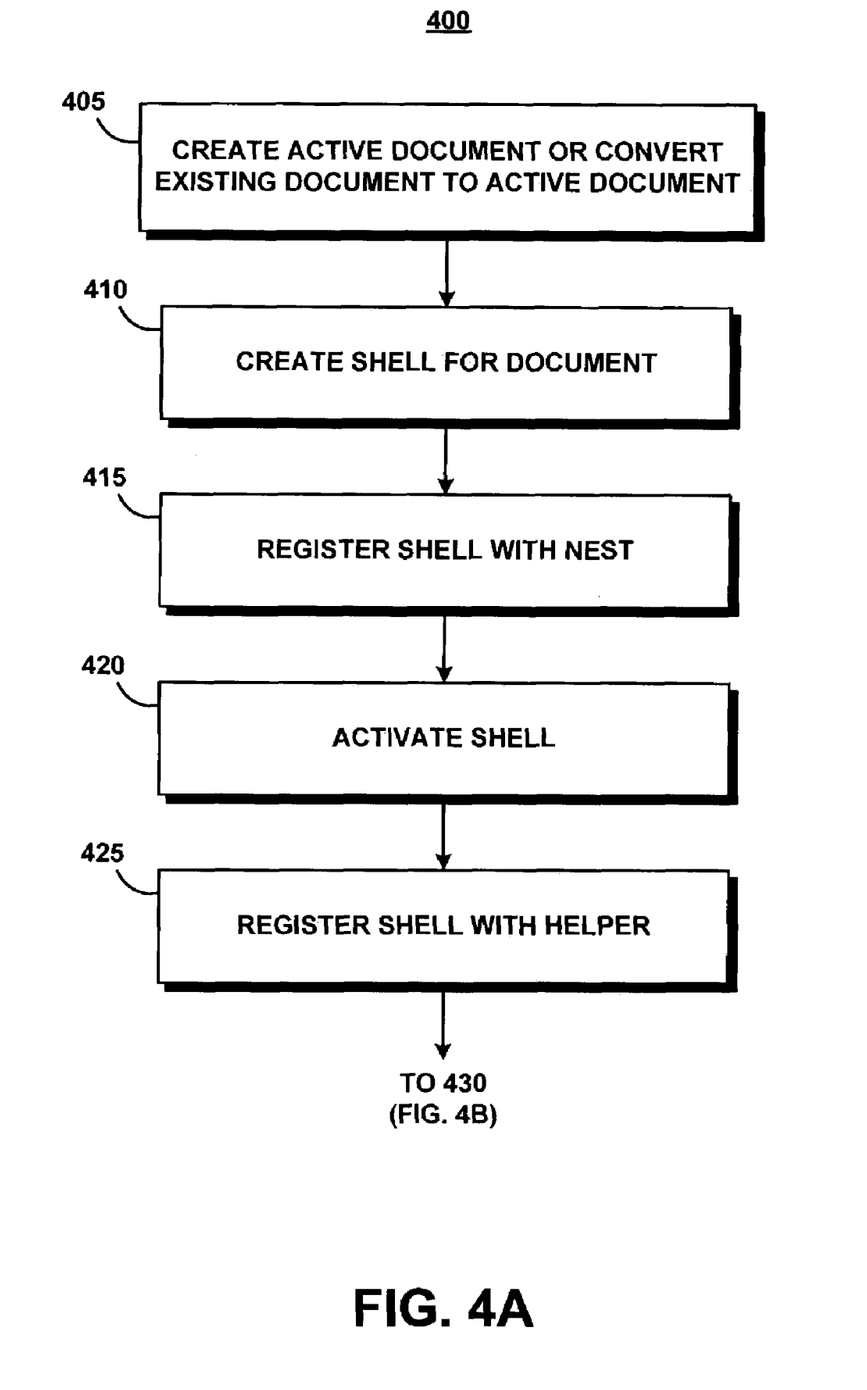
FIG. 4 is comprised of FIGS. 4A and 4B, and represents a process flow chart illustrating a method of operation for creating the shell for an active document, using the system of FIGS. 1 and 2.
Figure 4B:
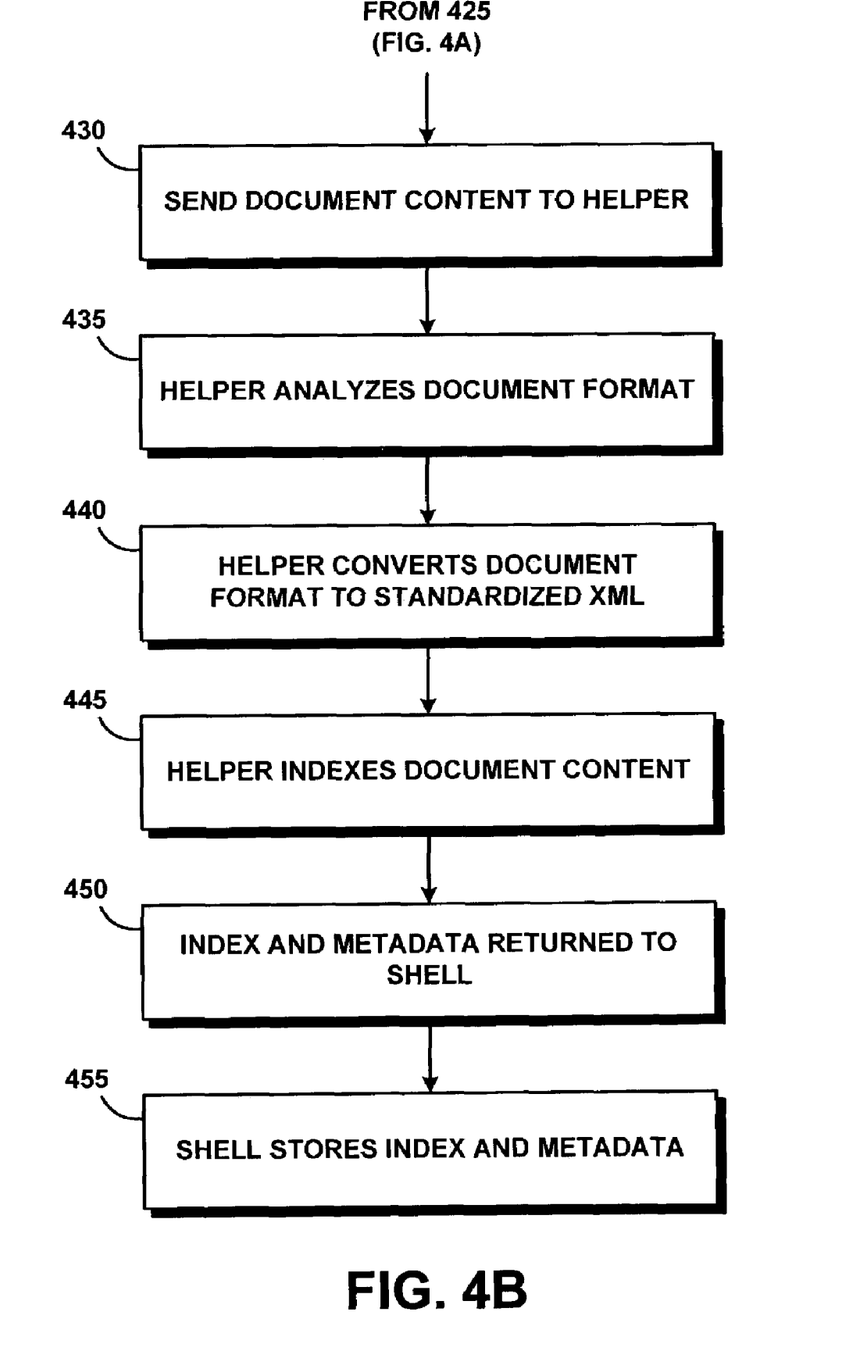

The method 400 of system 10 for implementing a shell for an active document is described by the process flow chart of FIGS. 4A and 4B. The user creates an active document 220 or converts an existing document to an active document 220 at block 405. System 10 then creates a shell 205 for the active document 220 at block 410. Shell 205 is then registered with a dedicated runtime environment, nest 210, at block 415. At block 420, system 10 activates shell 205. Shell 205 could be implemented as a thread of control within nest 210. Nest 210 will keep shell 205 active and alive and provides it with the necessary computation cycles. Some workload will be produced on the user's machine; the workload volume will depend on the number of shells 205 that nest 210 is serving. Implementing smart process management in nest 210 and moving non time-critical tasks to idle hours of the machine will alleviate machine usage.

During its lifetime, the active document 220 will gradually collect additional data and state information. This data and state information is stored in the workplace 320 of shell 205. Shell 205 can be stored in persistent storage such as a file system, database, etc. The software code of shell 205 contains a well defined API that provides connectivity, query, search, and various other document management features.

The design goal of system 10 is to keep shell 205 itself lightweight to avoid unnecessary overhead for each active document 220. Consequently, shell 205 has a basic execution framework that allows the user to add more functionality in form of plug-ins. These plug-ins are stored in a portion of the work place 320 or in nest 210. In addition, a nest 210 will contain some API such that the operating system or a client can interact with the active document 220.

Once system 10 activates a shell 205, shell 205 registers with the helper 215. Helper 215 provides additional processing power to shell 205 and performs various tasks and services for shell 205 on demand. Shell 205 is small and can't manage large computational tasks. Updating or maintaining the data in active document 220 or the index 325 may involve computationally intensive tasks. Consequently, shell 205 generates a task for helper 215. One such task would be converting the active document from XML to PDF® format. The helper 215 may reside on a different server machine for load balancing. Companies may provide these helper servers as a service or the helper 215 may be a grid of computers using a distributed approach. The main functions performed by shell 205 are communicating with other shells, nests, and helpers; indexing; delegating tasks to the helper; receiving results; parsing and converting.

Once system 10 registers shell 205 with helper 215, shell 205 sends its document content to the helper 215 at block 430. The helper 215 analyzes the document format at block 435. Continuing on to FIG. 4B, system 10 converts the document format to a common standardized XML format at block 440. System 10 then indexes the content according to the selected format at block 445. This index and other metadata is returned to shell 205 at block 450. Shell 205 stores the index data in index 325 and stores additional data such as metadata in workplace 320 for future access.

A user can interact with shell 205 directly by sending commands to shell 205. Sample commands are "view content" or "print content". Shell 205 will then invoke the appropriate document format viewer to display the content of active document 220. In addition, nest 210 will provide network connectivity for each shell 205. Consequently, shell 205 can be accessed over a network using a standardized protocol such as HTTP, SOAP, etc.

The ability of a user to initiate commands implemented by the active document 220 is a novel feature of system 10. Currently, a user selects a document using a pointing device in a file explorer (e.g. Windows Explorer®). The operating system has a mapping table of registered applications for the particular file type. From this mapping table, the operating system invokes the appropriate registered application with the name of the document as a parameter. Conversely, shell 205 receives a command from the user to view the content of its active document 220. Shell 205 then performs the actions required to open the viewer application, etc. The operating system is not directly involved with opening active document 220. System 10 might provide a GUI to help facilitate user input. Shell 205 models itself as a web service to provide users programmatic access.

Figure 5:
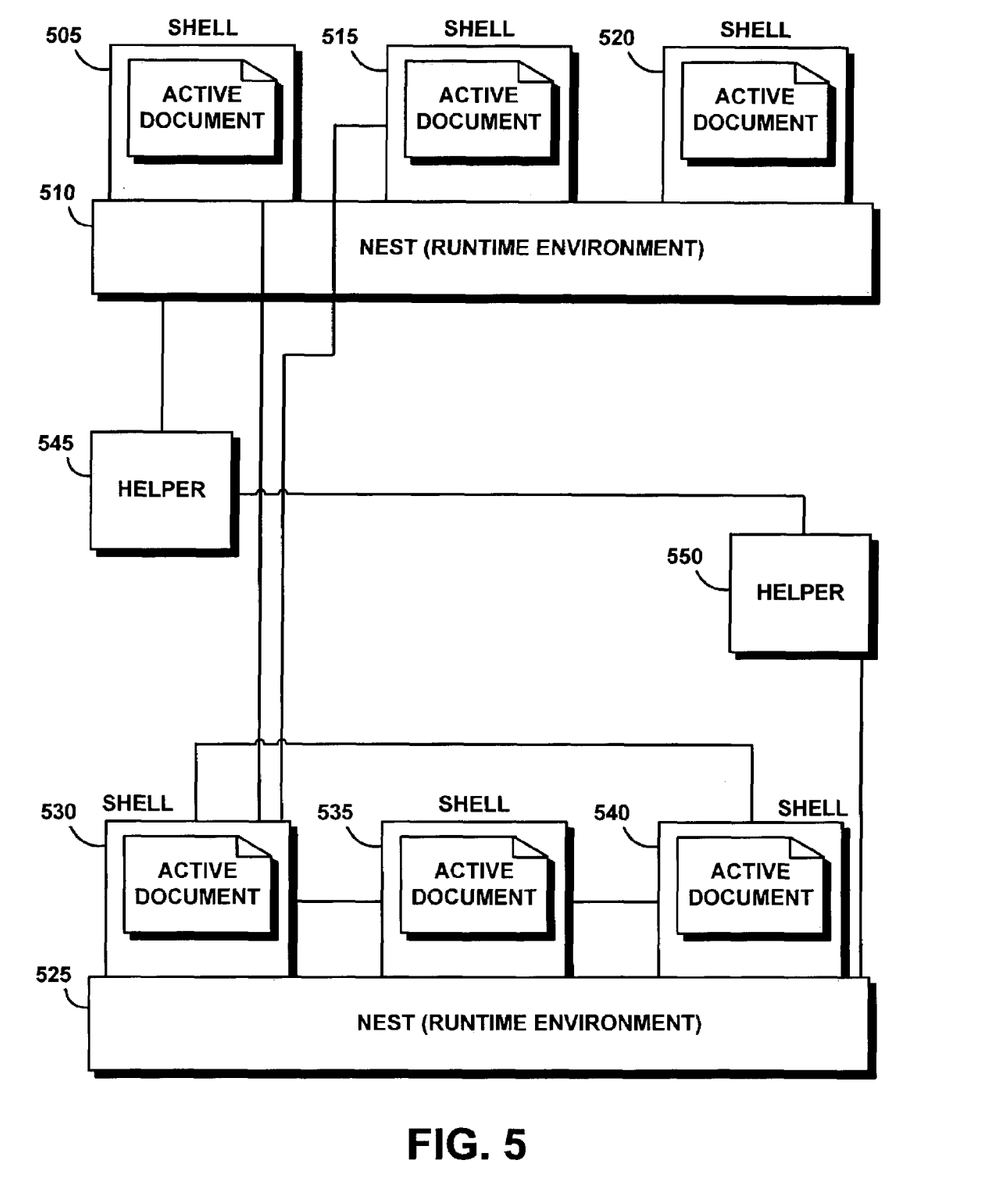
FIG. 5 is a block diagram connectivity of the system of FIGS. 1 and 2.

FIG. 5 shows the structural connectivity between components. A novel feature of system 10 is the ability of a shell to communicate with other shells. A shell such as shell 505 can communicate with its nest 510, other shells 515, 520 in its nest 510, other nests such as nest 525, or shells within other nests such as shells 530, 535, 540 in nest 525. Nest 510 can communicate with helper 545, and helper 545 can communicate with other helpers such as helper 550. It is also possible for helpers such as helper 545 to directly communicate with a shell such as shell 505. This structural connectivity is the basis for the active search architecture of system 10. For example, a user sends a query to nest 510 and nest 525. Nest 510 and nest 525 execute the query in parallel, querying each of the shells in their nest at the same time. The shells 505, 515, 520, execute the query from nest 510. If a "hit" occurs, the shell returns an address such as a URL to nest 510, and nest 510 forwards the address to the user. Similarly, shells 530, 535, 540 execute the query from nest 525, returning addresses as appropriate to nest 525 to forward to the user.

Figure 6A:
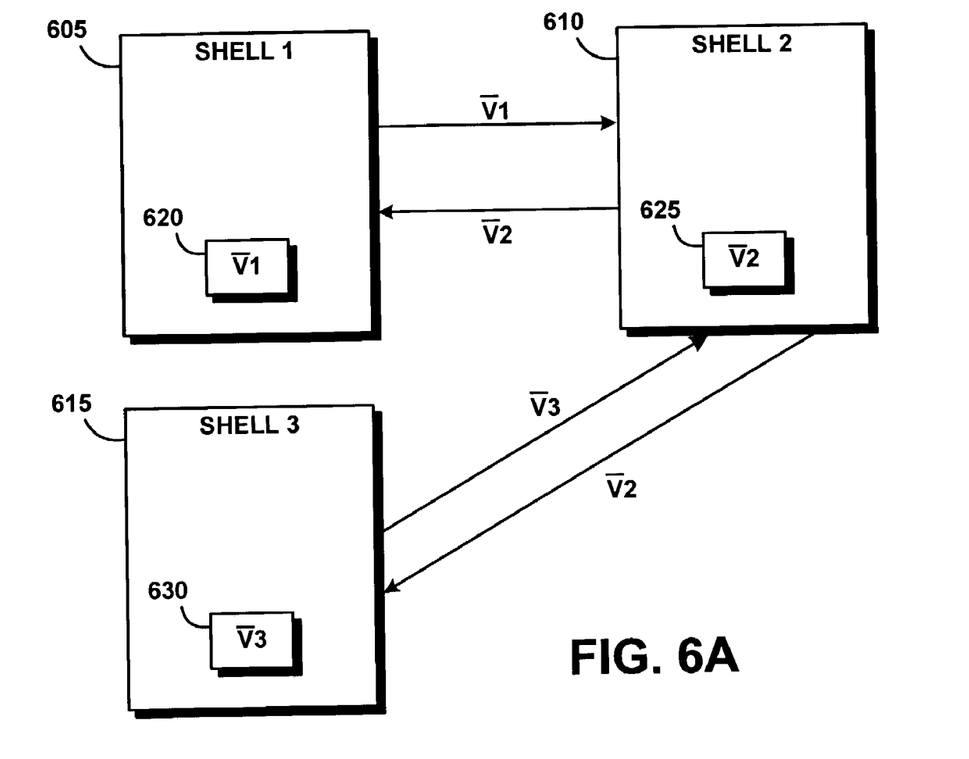
FIG. 6 is comprised of FIGS. 6A and 6B, and represents a block diagram and a graphical illustration, respectively, showing the method of the system of FIGS. 1 and 2 for determining similarity between active documents.

FIG. 6A illustrates the method 600 used by system 10 to determine similarity between active documents. Each active document has its own feature vector that can be derived from the index:

$$\nabla(X_1, X_2, X_3, X_4, \ldots, X_i).$$

Figure 6B:
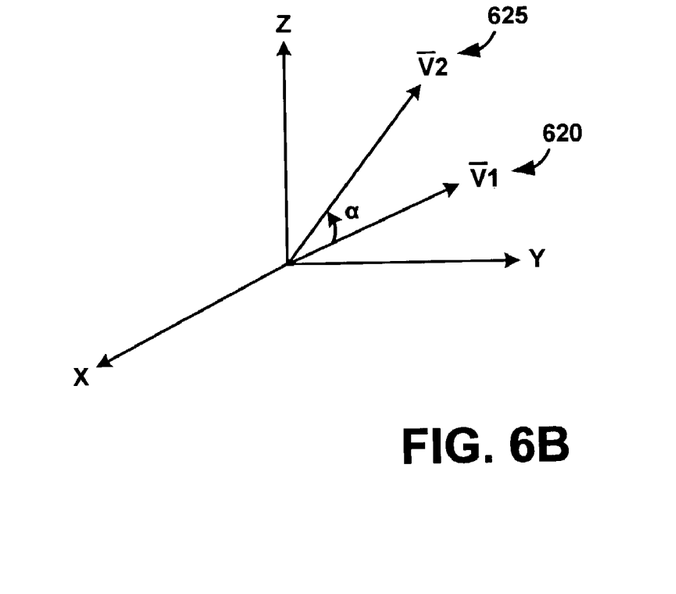

In a novel aspect of system 10, each shell exchanges feature vectors: shell 605 exchanges feature vectors with shell 610 and with shell 615. Shell 615 also exchanges feature vectors with shell 610. Shell 605 compares its own feature vector V1 620 with the feature vector V2 625 of shell 610. The comparison between these two vectors is shown graphically in the multidimensional vector space model of FIG. 6B. Shell 605 calculates the angle, α, between V1 620 and V2 625. If α is small, V1 620 and V2 625 are similar; otherwise, they are not similar. Each shell maintains a list of similar documents. If a user requests information that the active document does not have, the shell can refer or point the user to a similar file that does have the information. In a preferred embodiment, the feature vector is stored in each document.

Figure 7:
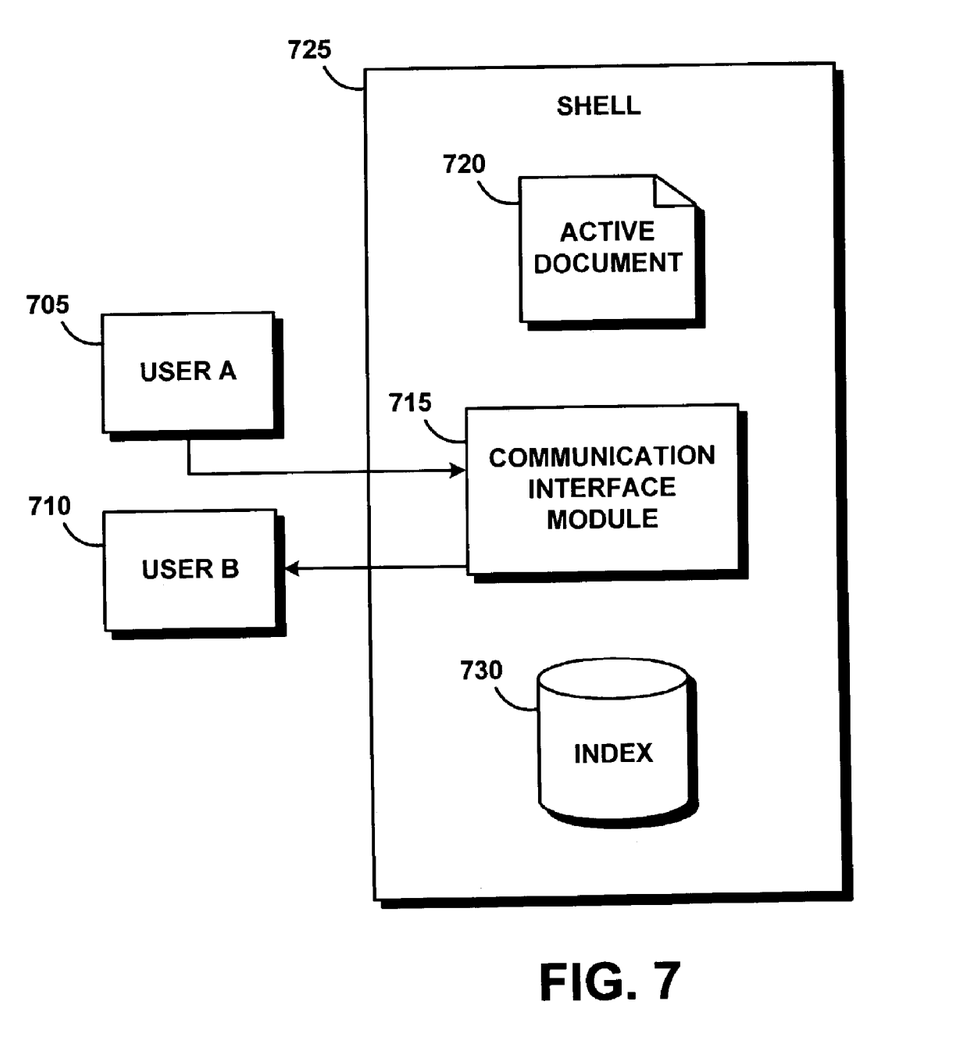
FIG. 7 is a block diagram illustrating the method of the system of FIGS. 1 and 2 for automatically contacting users that might be interested in the content of an active document.

FIG. 7 illustrates the method 700 used by system 10 to automatically contact users that might be interested in the content of an active document. As user A 705 and user B 710 interact via communication interface module 715 with active document 720 in shell 725, shell 725 reads and stores their user profiles in index 730. Alternatively, shell 725 can obtain user profiles through a personal and social automation management system in which users list interests, hobbies, etc. User A 705 later modifies active document 720 in shell 725, writing an article about technology X. Shell 725 knows the interests of user B 710 from the user's profile. The active document 720 has evolved, now containing information of interest to user B 710. The shell 725 sends an e-mail to user B 710 informing them that active document 720 might be of interest. User B is apprised of the content of active document 720 even though the paper is not yet published.

Figure 8:
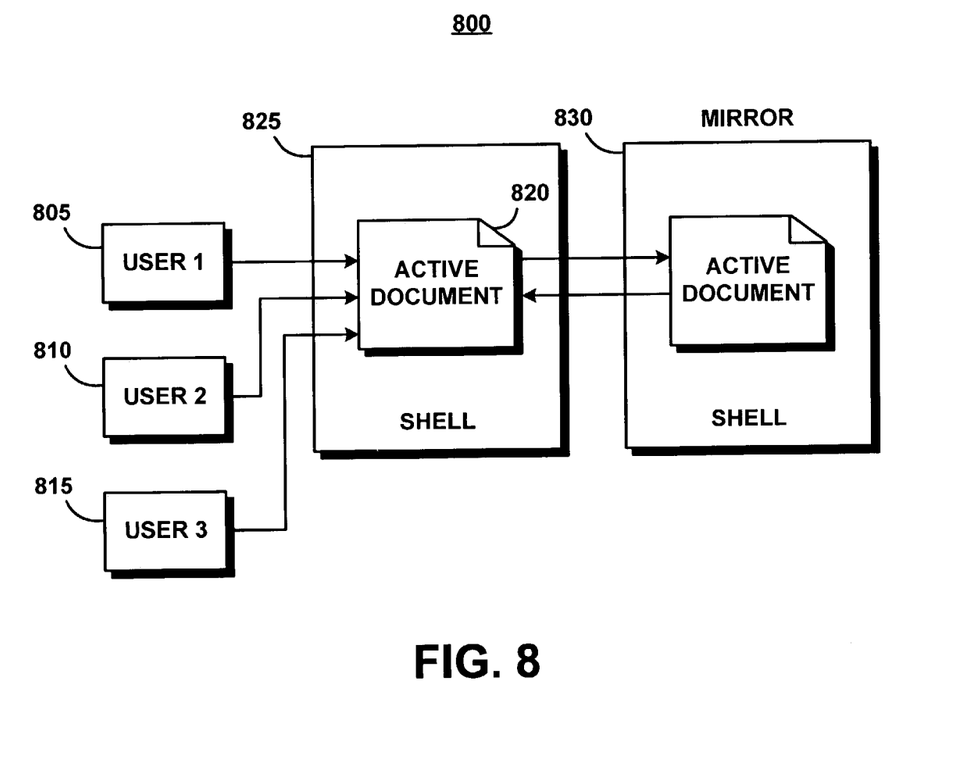
FIG. 8 is a block diagram illustrating the method of the system of FIGS. 1 and 2 for synchronizing the contents of a document being collaboratively edited.

FIG. 8 illustrates the method 800 of system 10 synchronizing active document content. With current document management technology, collaborative editing is difficult to maintain when many users are working on the same document. A novel feature of system 10 is its ability to manage the collaborative editing process. User 1 805, user 2 810, and user 3 815 are editing active document 820 in shell 825. Shell 825 synchronizes the content, index, and other information regarding active document 820 with a mirror shell 830.

Figure 9:
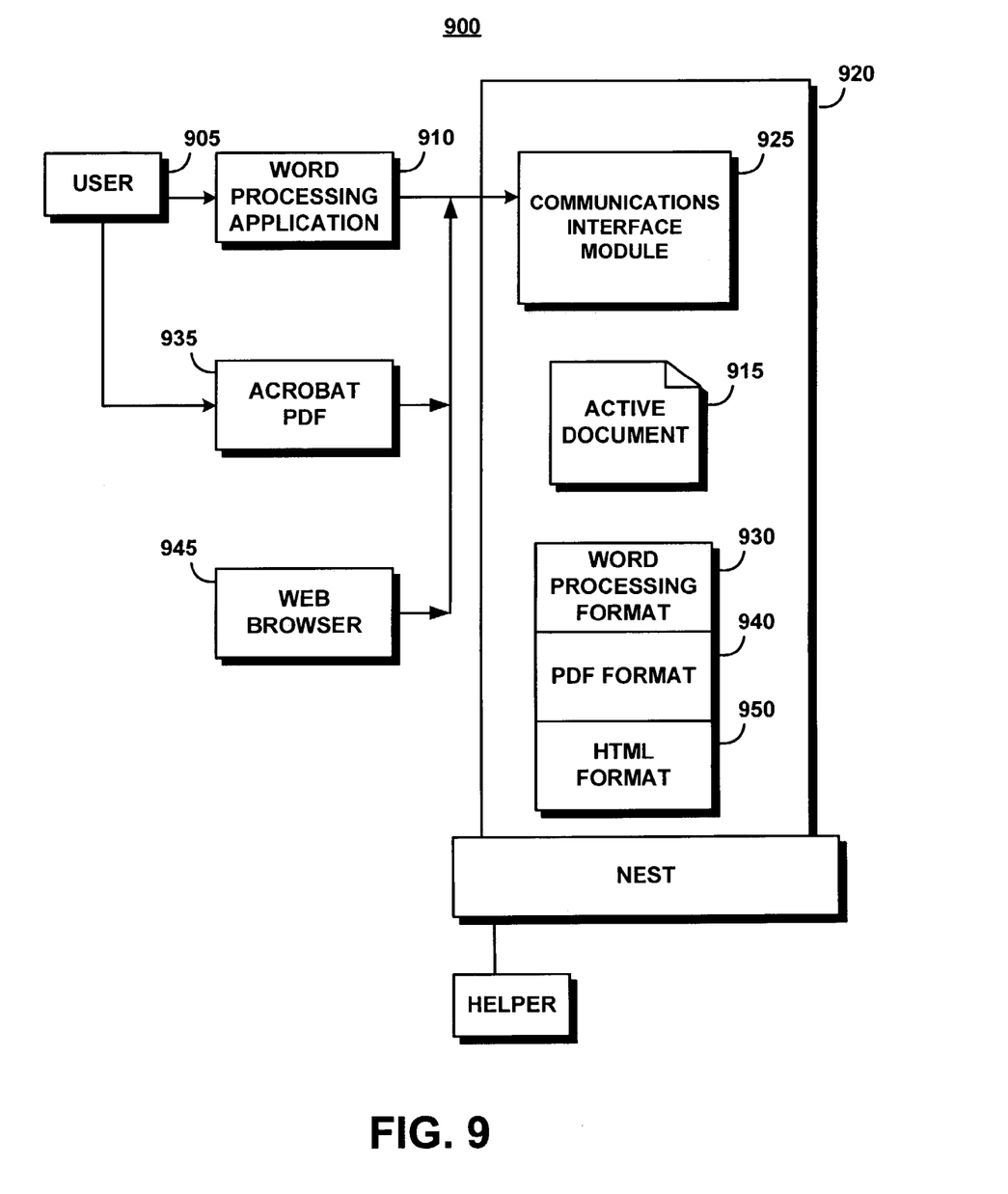
FIG. 9 is a block diagram illustrating the method of the system of FIGS. 1 and 2 for converting the underlying document format of an active document.

FIG. 9 illustrates the method 900 of system 10 in converting the underlying document format of the active document. All active documents are active from the time the user's personal computer is turned on. User 905 opens word processing application 910 and wishes to edit active document 915 by notifying shell 920 through the communications interface module 925. Shell 920 converts the XML format of active document 915 to word processing format 930 then sends the word processing data to word processing application 910. User 905 may now edit active document 915 with word processing application 910. Shell 920 can read the XML format of active document 915. Shell 920 is a running process; there is no read operation for active document 915.

User 905 may wish to read active document 915 in PDF format. User 905 then opens Acrobat® 935; it sends a command to shell 920 requesting active document 915. Shell 920 converts the XML format of active document 915 to PDF format 940 and returns to Acrobat® 935 a byte stream of data, not a file. In addition, web browser 945 may send a command to shell 920 requesting active document 915 in HTML format. Shell 920 converts the XML format of active document 915 to HTML 950 for web browser 945. The active document 915 is stored only once in a general format. The active document 915 renders itself in the format required by the application used to modify or view the document.

It is to be understood that the specific embodiments of the invention that have been described are merely illustrative of certain application of the principle of the present invention. Numerous modifications may be made to the system and method for providing a runtime environment for interactive and live web based document resources invention described herein without departing from the spirit and scope of the present invention.

What is claimed is:

1. A processor-implemented method for providing a runtime environment comprising:

transforming a passive document into a first active document by creating a first shell exclusively for the first active document;

wherein the first shell surrounds the first active document, and comprises:

an executable code that provides management and connectivity features to the first active document; and an interface to provide access to the first active document;

registering the first shell with a first helper upon activation of the first shell;

wherein the first shell has a computational power that is substantially smaller than a computational power of the first helper;

wherein the first helper provides to the first shell, at least some of the processing power of the first helper;

wherein the first helper selectively performs, on demand, at least some of the tasks on behalf of the first shell;

wherein the first shell operates in the runtime environment to coordinate the management and connectivity features and to distribute tasks;

wherein the first active document is processable as a process rather than a passive document; and wherein the first active document gradually collects additional data and state information.

2. The method of claim 1, further comprising the first shell sending a command to at least a second shell of a second active document.

3. The method of claim 2, further comprising the second active document interpreting the command from the first shell.

4. The method of claim 3, wherein the second active document executing the command from the first shell.

5. The method of claim 4, wherein the second active document automatically transmitting a response generated as a result of the execution of the command, to the first active document.

6. The method of claim 1, wherein generating the first active document comprises converting a passive document to an active document.

7. The method of claim 6, wherein the passive document is a web based document.

8. The method of claim 1, further comprising registering the first shell within the runtime environment.

9. The method of claim 8, further comprising registering a first helper within the runtime environment; and wherein the active document gradually collects additional data and state information.

10. The method of claim 1, wherein generating the first active document comprises analyzing a format of the first active document.

11. The method of claim 10, further comprising converting the format of the first active document to a standardized format.

12. The method of claim 11, wherein the standardized format comprises XML.

13. The method of claim 10, wherein the first shell converts the format of the first active document to a target format of another document.

14. The method of claim 1, further comprising indexing a content of the first active document as a first index.

15. The method of claim of claim 14, further comprising storing the first index and associated metadata in a storage that is external to the first active document.

16. The method of claim 14, further comprising the first shell automatically updating the first index when the content of the first active document is modified.

17. The method of claim 16, further comprising sending a notification request to other shells when the first index is modified, to verify whether or not the other shells are similar to the first shell.

18. The method of claim 16, wherein the first shell registers the first index with a search engine supporting active documents, to creating an active search architecture.

19. The method of claim 18, further comprising the first active document sending an erase request to a search engine in the event the first active document is deleted.

20. The method of claim 19, further comprising the first active document maintaining a reference list of search engines with which the first active document is registered.

21. The method of claim 1, further comprising the first shell maintaining a first feature vector.

22. The method of claim 21, further comprising the first shell exchanging the first feature vector with the other shells.

23. The method of claim 22, further the first shell calculating an angle between the first feature vector and feature vectors of the other shells.

24. A computer program product having a plurality of executable instruction codes that are stored on a computer-readable medium, for providing a runtime environment, comprising:
   a first set of instruction codes for transforming a first active document from a passive document by creating a first shell exclusively for the first active document;
   wherein the first shell surrounds the first active document, and comprises:
      an executable code that provides management and connectivity features to the first active document; and
      an interface to provide access to the first active document; and
   a third set of instruction codes for registering the first shell with a first helper upon activation of the first shell;
   wherein the first shell has a computational power that is substantially smaller than a computational power of the first helper;
   wherein the first helper provides to the first shell, at least some of the processing power of the first helper;
   wherein the first helper selectively performs, on demand, at least some of the tasks on behalf of the first shell;
   wherein the first shell operates in the runtime environment to coordinate the management and connectivity features and to distribute tasks;
   wherein the first active document is processable as a process rather than a passive; and
   wherein the first active document gradually collects additional data and state information.

25. A processor-implemented system for providing a runtime environment, comprising:
   means for generating a first active document from a passive document by creating a first shell exclusively for the first active document;
   wherein the first shell surrounds the first active document, and comprises:
      an executable code that provides management and connectivity features to the first active document; and
      an interface to provide access to the first active document;
   means for registering the first shell with a first helper upon activation of the first shell;
   wherein the first shell has a computational power that is substantially smaller than a computational power of the first helper;
   wherein the first helper provides to the first shell, at least some of the processing power of the first helper;
   wherein the first helper selectively performs, on demand, at least some of the tasks on behalf of the first shell;
   wherein the first shell operates in the runtime environment to coordinate the management and connectivity features and to distribute tasks;
   wherein the first active document is processable as a process rather than a passive; and
   wherein the first active document gradually collects additional data and state information.

* * * * *